United States Patent
Alumbaugh et al.

(10) Patent No.: US 8,392,119 B2
(45) Date of Patent: Mar. 5, 2013

(54) ANALYSIS OF SUBSURFACE ELECTROMAGNETIC DATA THROUGH INVERSION WITH CONSTRAINED CASING CORRECTION COEFFICIENTS

(75) Inventors: David L. Alumbaugh, Berkeley, CA (US); Cyrille Levesque, Sugar Land, TX (US); Ping Zhang, Albany (CA); Guozhong Gao, Watertown, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 479 days.

(21) Appl. No.: 12/769,512

(22) Filed: Apr. 28, 2010

(65) Prior Publication Data

US 2010/0277177 A1 Nov. 4, 2010

Related U.S. Application Data

(60) Provisional application No. 61/173,739, filed on Apr. 29, 2009.

(51) Int. Cl.
*G01V 1/28* (2006.01)

(52) U.S. Cl. .......................................... 702/7

(58) Field of Classification Search .................. 702/6, 7, 702/8, 11
See application file for complete search history.

(56) References Cited

U.S. PATENT DOCUMENTS

| | | | |
|---|---|---|---|
| 6,294,917 B1 | 9/2001 | Nichols | |
| 7,328,107 B2 * | 2/2008 | Strack et al. | 702/14 |
| 7,565,244 B2 | 7/2009 | Alumbaugh et al. | |
| 2009/0005993 A1 | 1/2009 | Abubakar et al. | |
| 2009/0043554 A1 * | 2/2009 | Horne et al. | 703/10 |
| 2009/0157320 A1 | 6/2009 | Abubakar et al. | |

* cited by examiner

*Primary Examiner* — Aditya Bhat
(74) *Attorney, Agent, or Firm* — Jeremy Berman; Darla P. Fonseca

(57) ABSTRACT

Methods and related systems are described for analyzing electromagnetic survey data. Electromagnetic survey data of a subterranean formation is obtained using at least a downhole transceiver deployed in a borehole and a transceiver positioned on the surface, or in the same or another borehole. Limits are defined for casing correction coefficients that account for effects of the borehole casing. A constrained inversion process is performed solving for the casing correction coefficients within the defined limits, and for one or more parameters of a model representing attributes, such as resistivity, of the subterranean formation.

34 Claims, 9 Drawing Sheets

ANALYSIS OF SUBSURFACE ELECTROMAGNETIC DATA THROUGH INVERSION WITH CONSTRAINED CASING CORRECTION COEFFICIENTS

CROSS REFERENCE TO RELATED APPLICATION

This patent application claims benefit of U.S. Provisional Patent Application Ser. No. 61/173,739, filed Apr. 29, 2009, which is incorporated by reference herein.

BACKGROUND

1. Field

This patent specification relates to analyzing subsurface electromagnetic survey data. More particularly, this patent specification relates to methods and systems for analyzing electromagnetic survey data obtained using receivers and/or transmitters in a conductive casing lined borehole. Even more particularly, this patent specification relates to methods and systems for improved analysis of such survey data through inversion with constrained casing correction coefficients.

2. Background

Cross borehole (CB), surface-to-borehole (STB), and borehole-to-surface (BTS) and single well electromagnetic (EM) imaging surveys include a series of electric or magnetic dipole sources that are energized in a borehole, on the surface of the earth, or near the seafloor, and measurements of magnetic and/or electric fields are made in a different borehole, or on the earth's surface or seafloor.

The purpose of the surveys are typically to provide an image of formation resistivity, including the location of high resistivity zones such as hydrocarbon bearing reservoirs, gas injection zones, and fresh-water aquifers, and conductors such as produced by the presence of saline water, mineralized zones, and shale and clay. These images are used for applications such as but not limited to the characterization of hydrocarbon reservoirs and ground-water aquifers, for locating bypassed oil deposits, for monitoring reservoir production, groundwater, steam, and gas injection processes, and for imaging saltwater intrusion into aquifers.

One issue related to surveying methods that are presently used for these electromagnetic imaging techniques is the effect of steel casing on the EM fields measured or broadcasted by borehole sensors. The attenuation induced by the conductive casing requires a correction to be applied so only the formation signal is being inverted for. Such methods of casing effect removal have been detailed in the literature review contained in U.S. Pat. No. 6,294,917 (hereinafter "the '917 Patent") and U.S. Pat. No. 7,565,244 (hereinafter "the '244 Patent"), and in U.S. Patent Application Nos. 2009/0005993(hereinafter "the '993 Patent Application") and 2009/0157320 (hereinafter "the '320 Patent Application"), all four of which are hereby incorporated by reference herein. The '244 Patent, and the '993 and '320 Patent Applications also provide a method for calculating multiple beta ($\beta$ coefficients (or casing attenuation coefficients) by treating beta essentially as a model parameter to be inverted.

However, in some situations it has been found that the above described beta inversion techniques may produced unsatisfactory results. In particular, when solving for a parameter such as resistivity in some applications the resistivity values produced close to the borehole may be unacceptably biased. Thus, there is a need in some applications for an improved technique.

SUMMARY

According to some embodiments, a method of analyzing electromagnetic survey data is provided. The method includes receiving electromagnetic survey data of a subterranean formation obtained using at least a first downhole transceiver (such as an electromagnetic receiver or transmitter) deployed in a borehole cased with a conductive liner and a second transceiver; computing predicted electromagnetic data based on one or more models; defining limits for casing correction coefficients, the casing correction coefficients being useful for accounting for effects of the borehole casing; and performing an inversion process based at least in part on comparing portions of the electromagnetic survey data and portions of the predicted electromagnetic data. The inversion process solves for the casing correction coefficients within the defined limits, and for one or more parameters of the model representing one or more attributes of the subterranean formation (such as resistivity, conductivity, velocity, density, porosity and/or permeability). The casing correction coefficients, for example, can correspond to casing effects at a depth position for a transceiver within the casing.

According to some embodiments, the defined limits are based on estimated values for the casing correction coefficients. The values can be estimated by performing an inversion process assuming a single casing correction coefficient value for the casing at depth locations corresponding to the survey data, with the defined limits being based on data misfit for each of a plurality of transceiver positions along the casing. The values can also be estimated based on additional measurements such as electromagnetic imaging, cased-hole resistivity, and ultrasonic imaging. The defined limits can be based on uncertainty relating to the additional measurements.

According to some embodiments the analyzed survey data can be used to monitor water injected into the subterranean formation from the borehole. The electromagnetic receiver can includes electric and/or a magnetic field sensors deployable downhole.

According to some embodiments, a system is also provided for analyzing electromagnetic survey data. The system includes a processing system configured and programmed to receive electromagnetic survey data of a subterranean formation obtained using at least a first downhole transceiver deployed in a cased borehole and a second transceiver, to compute predicted electromagnetic data based on one or more models, to define limits for the casing correction coefficients, the casing correction coefficients being useful for accounting for effects of the borehole casing, and to perform an inversion process based at least in part on comparing portions of the electromagnetic survey data and portions of the predicted electromagnetic data. The inversion process solves for at least the casing correction coefficients within the defined limits, and for one or more parameters of the model representing one or more attributes of the subterranean formation.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

DETAILED DESCRIPTION OF THE PREFERRED EMBODIMENTS

Figure 1A:
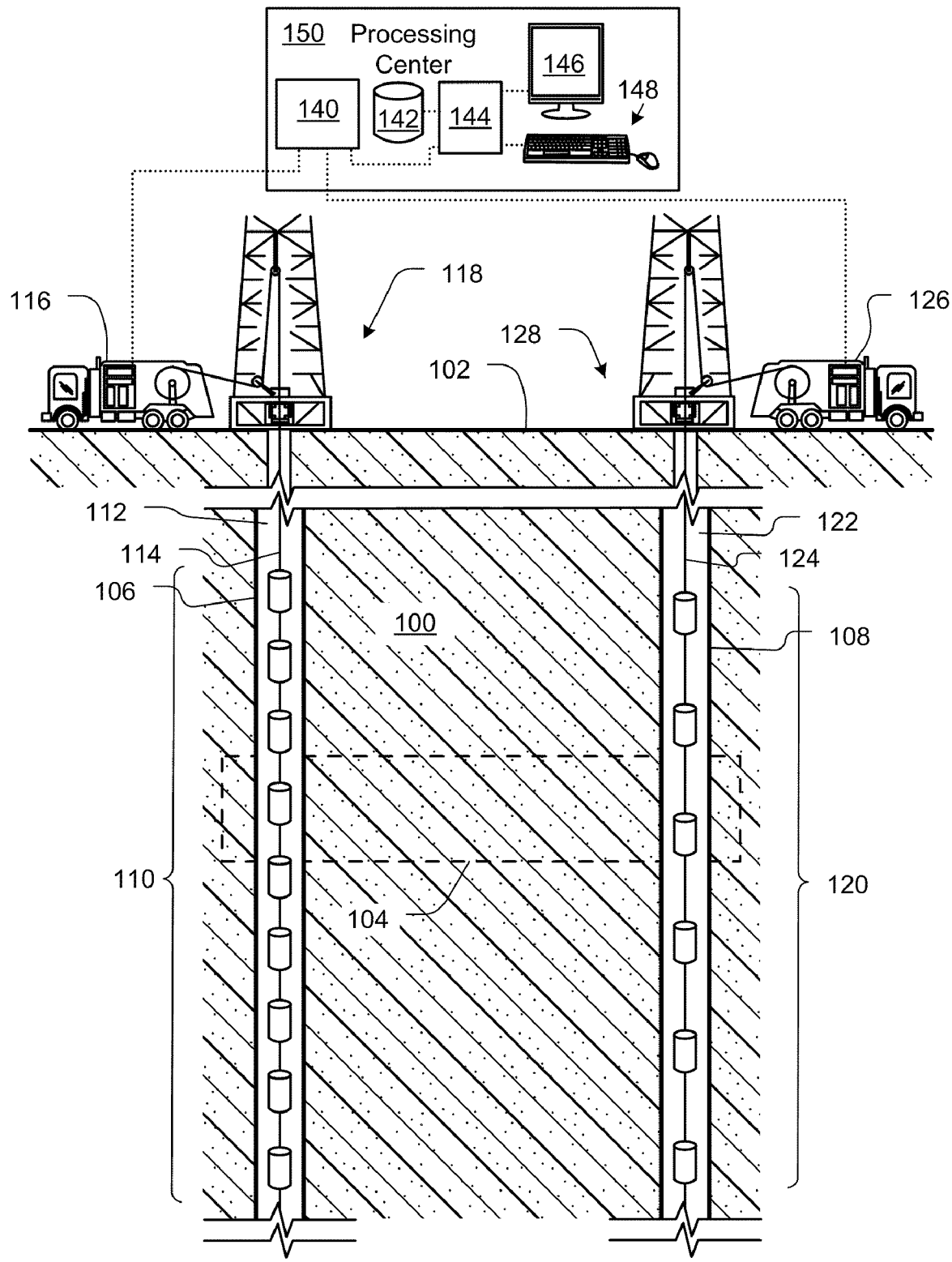
FIGS. 1A-D are schematic drawings illustrating different source-receiver array geometries, according to some embodiments.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

According to some embodiments, systems and methods are described herein that relate to cross-well ElectroMagnetics (x-well EM), surface-to-borehole EM(STB), borehole-to-surface (BTS), and single well electromagnetic (EM) imaging surveys whereby a series of electric and/or magnetic dipole sources are energized in a borehole, on the surface of the earth, or near the seafloor, and measurements of magnetic and/or electric fields are made in a different borehole, or on the earth's surface or seafloor, or inside the same borehole.

Figure 1B:
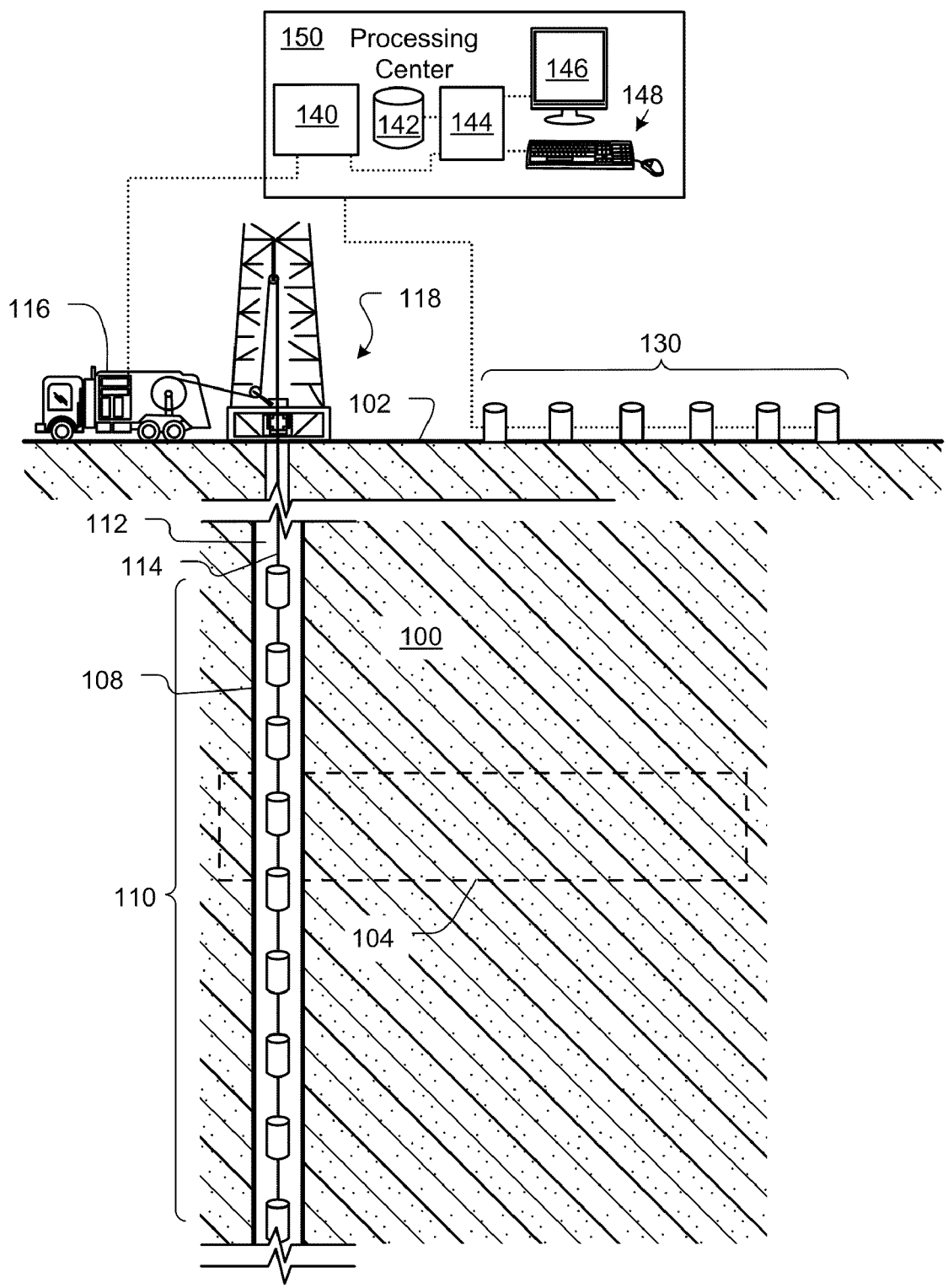
Figure 1C:
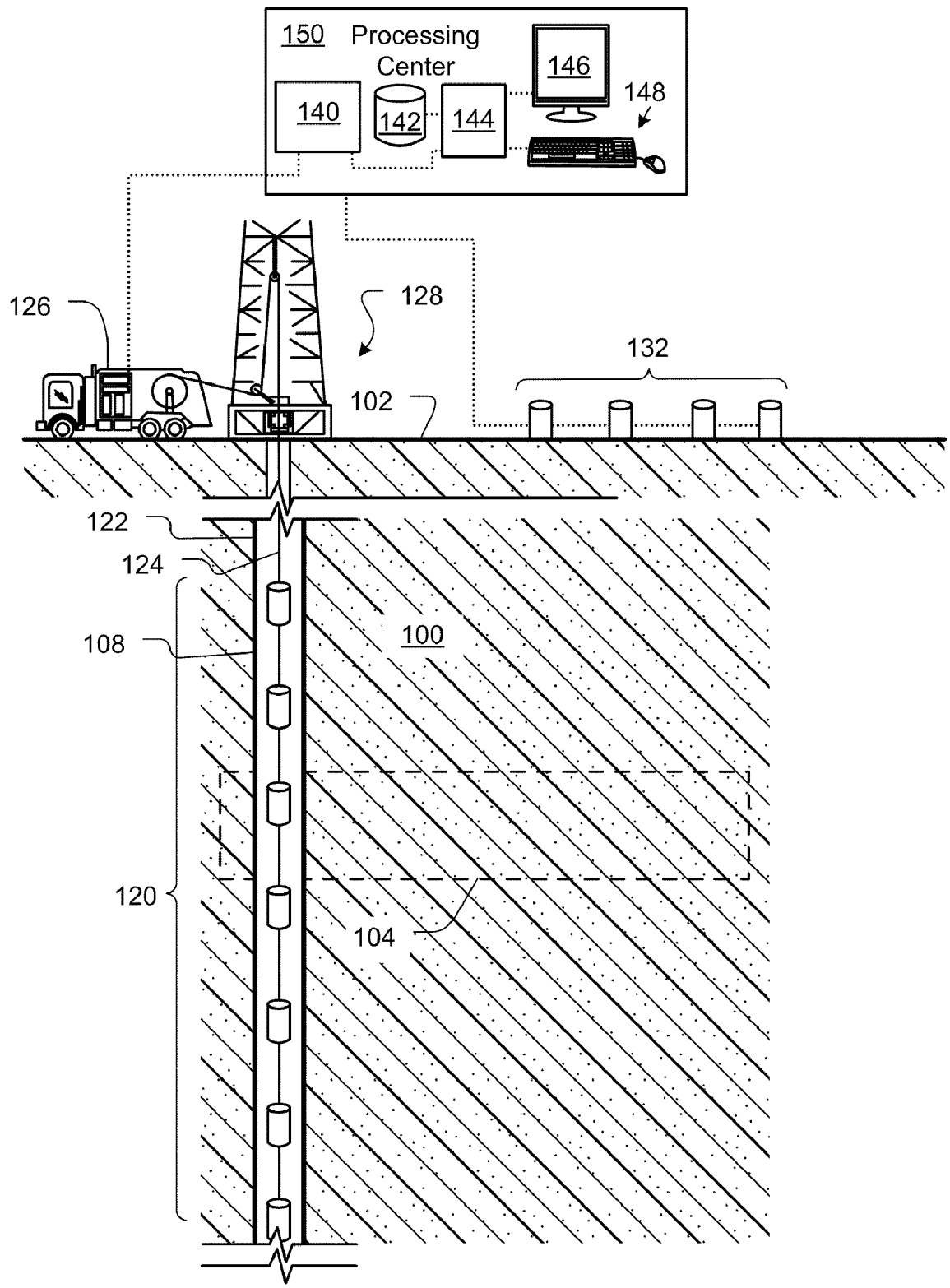
Figure 1D:
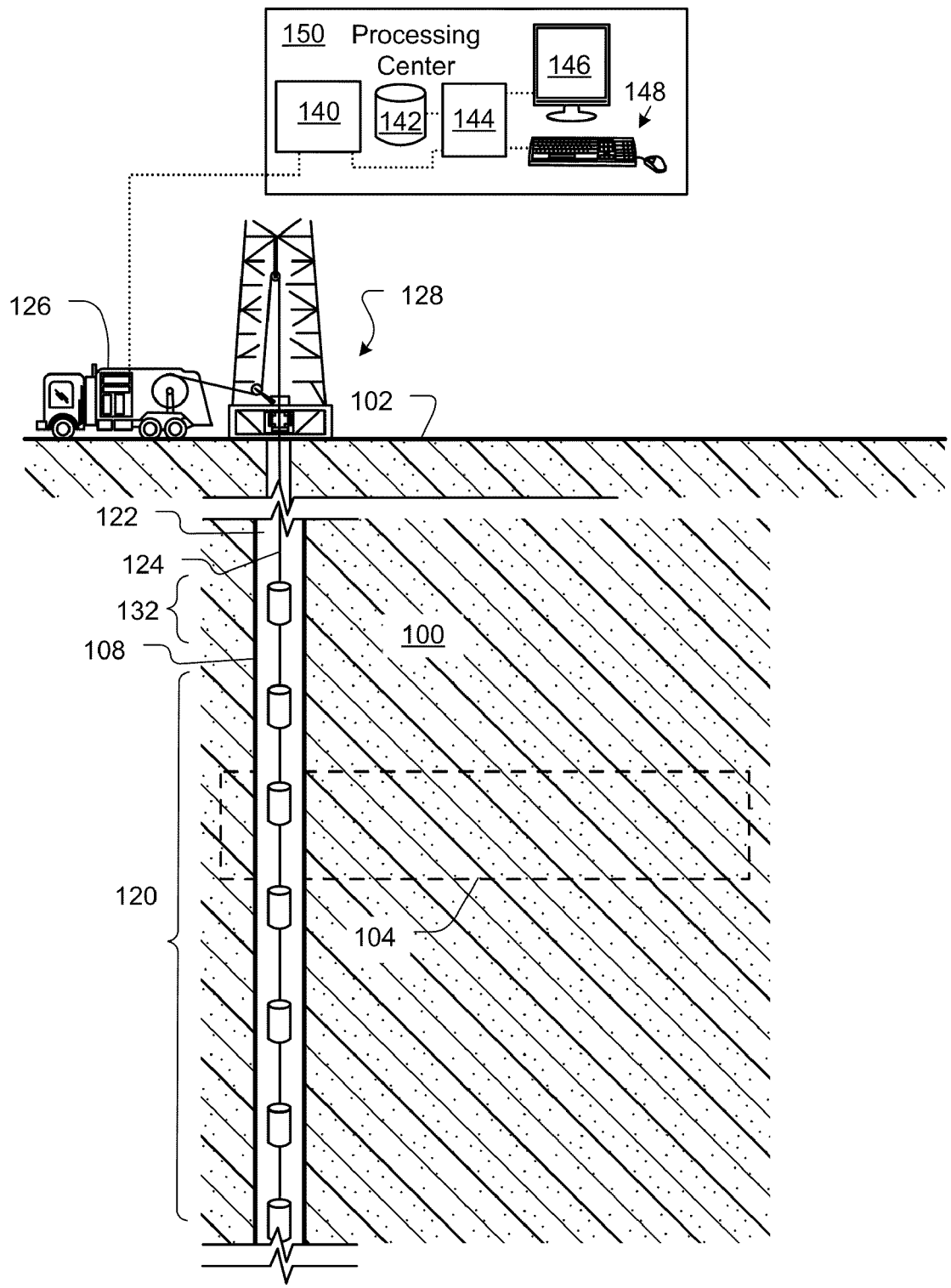

FIGS. 1A-D are schematic drawings illustrating different source-receiver array geometries, according to some embodiments. FIG. 1A shows a cross borehole configuration in which an array of electromagnetic sources 110 deployed in a borehole 112 having a casing 106, and an array of electromagnetic field receivers 120 deployed in a borehole 122 having a conductive casing 108. Sources 110 are deployed via a wireline 114 from wireline truck 116 at wellsite 118 on the surface 102. Similarly, receivers 120 are deployed via a wireline 124 from wireline truck 126 at wellsite 128. FIG. 1B shows a borehole-to-surface configuration in which electromagnetic sources 110 are deployed in borehole 112 having a conductive casing 108, and an array of electromagnetic field receivers 130 are deployed on the surface 102. FIG. 1C shows a surface-to-borehole configuration in which electromagnetic field receivers 120 are deployed in borehole 122 having a conductive casing 108, and an array of electromagnetic sources 132 are deployed on the surface 102. FIG. 1D shows a single well configuration in which electromagnetic field receivers 120 and an electromagnetic source 132 are deployed in borehole 122 having a conductive casing 108.

Also shown in FIGS. 1A-D is a processing center 150 which includes one or more central processing units 144 for carrying out the data processing procedures as described herein, as well as other processing. Processing center 150 also includes a storage system 142, communications and input/output modules 140, a user display 146 and a user input system 148. According to some embodiments, processing center 150 can be included in one or both of the logging trucks 116 and 126, or may be located in a location remote from the wellsites 118 and 128. Although the surface 102 is shown in FIGS. 1A-D as being a land surface, according to some embodiments, the region above the surface 102 can be water as in the case of marine applications. For example, for the BTS and STB cases shown in FIGS. 1B and 1C respectively, surface 102 is the sea floor and receivers 132 and sources 130 are deployed from a vessel.

Boreholes 112 and 122 are formed within a subterranean formation 100, and at least one of the boreholes involved in the survey is cased with a conductive material such as steel or Chromium alloyed steel. According to some embodiments, for a controlled-source electromagnetic survey, the sources 110 and 132 are polarized electric or magnetic dipole sources. In the case of surface sources 132, according to some embodiments, are either deep-towed or stationary sources. According to some embodiments, the sources 110 and 132 are used to excite band-limited low-frequency (for example ~0.01-3 kHz) electromagnetic signals. These signals propagate through the subsurface and are perturbed by geologic variation to depths of several km. According to some embodiments, receivers 120 and 130 are spatially-distributed, multi-component, broad-band receivers record the electromagnetic energy. According to some embodiments, transmitted and recorded signals can be electric fields, magnetic fields, or a combination of both.

According to some embodiments, the EM survey is used to non-intrusively provide an image of formation resistivity, including the location of high resistivity zones such as hydrocarbon bearing reservoirs, gas injection zones, and freshwater aquifers, and conductors such as produced by the presence of saline water, mineralized zones, and shale and clay. These images are used for applications such as but not limited to the characterization of hydrocarbon reservoirs and groundwater aquifers, for locating bypassed oil deposits, for monitoring reservoir production, groundwater, steam, and gas injection processes, and for imaging saltwater intrusion into aquifers.

The attenuation induced by the conductive casing benefits from an applied correction so that the formation signal alone can be inverted for. Known methods of casing effect removal are described in the '917 and '244 Patents, and in the '993 and the '320 Patent Applications, all four of which are hereby incorporated by reference herein. The '244 Patent, the '993 Patent Application and the '320 Patent Application also provide further description for calculating multiple β coefficients (or casing attenuation coefficients) by treating β essentially as a model parameter to be inverted.

According to some embodiments, an improved estimation is provided of the β coefficients to compensate for the effects of steel casing and/or near-surface heterogeneity in x-well EM, STB, and BTS EM measurements. According to some embodiments, these techniques complement the techniques described in the '917 and '244 Patents, and in the '993 and the '320 Patent Applications.

According to some embodiments, a data inversion workflow is provided for electromagnetic geophysical data using various acquisition geometries where by distortions caused by the effects of steel casing will be properly estimated and constrained during an inversion process.

Typically, the processing of borehole EM data, and in particular x-well EM data, involves the inversion of the field data to produce a 2D (or 3D) image of the reservoir electrical resistivity. This can be accomplished via a computer algorithm that numerically minimizes the following cost function (for further detail see the '993 Patent Application);

$$S_d = ||W_d[d_{obs} - \beta d_{pc}(m)]||^2 \quad (1)$$

Here $d_{obs}$ is a vector of measured data, $d_{Pr}$ is numerical data calculated by a forward modeling algorithm that accounts for 2D or 3D geologic structures, β is a vector to account for casing effects at each transmitter/receiver position, m is the model vector of resistivities at different positions between and around the wells that we are trying to reconstruct, and $W_d$ is a data weighting matrix that can include information about the quality of the data in a statistical sense. During the inversions both m and β will be estimated to minimize the cost function.

In a typical inversion, each transmitter/receiver will have a unique β value to account for casing effect at the occupied location. This is why β inversions can be used to remove casing effects (see, the '993 Patent Application). Conventionally, there are no constraints imposed on β during the inversions, reflecting the fact that accurate knowledge is not available about the size of the casing effects which typically depend on casing conductivity (δ), magnetic permeability (μ) and thickness (t). With the conventional approach, it is hoped that the inversions will estimate resistivity structure (m) and casing factors (β) independently. However, in the course of processing and interpreting field data, it has been found that in some situations unconstrained β inversions may produce biased resistivities at locations close to the well where the casing parameter is being estimated. In particular, it has been found that when a high conductivity zone is in contact with the conductive casing a conventional unconstrained β inversion may lead to under estimation of the conductivity of that zone. An example of this situation is when an EM survey is used to monitor a water injection procedure.

Figure 2A:
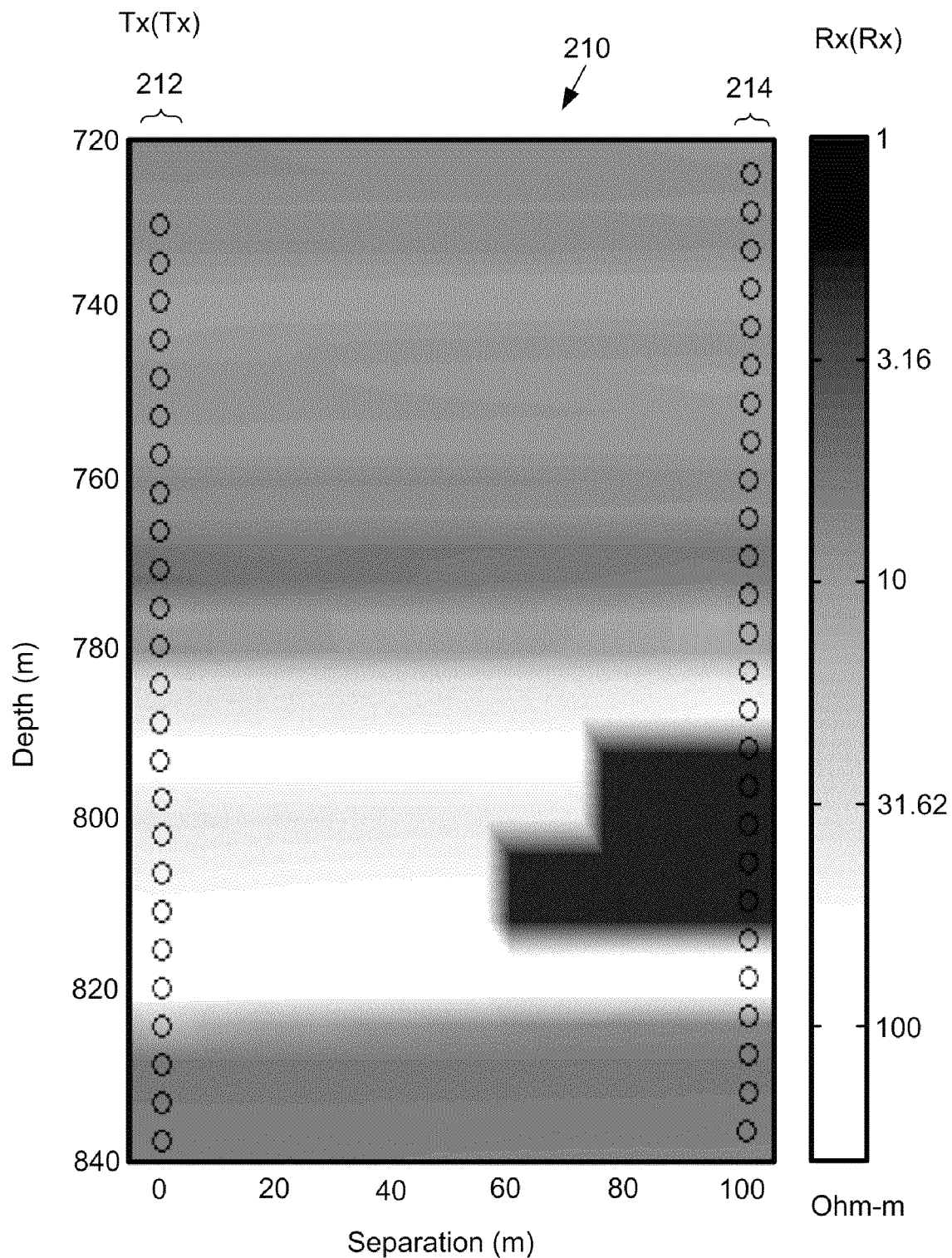
FIGS. 2A-B a plots of a synthetic example demonstrating a bias effect of unconstrained β inversions.
Figure 2B:
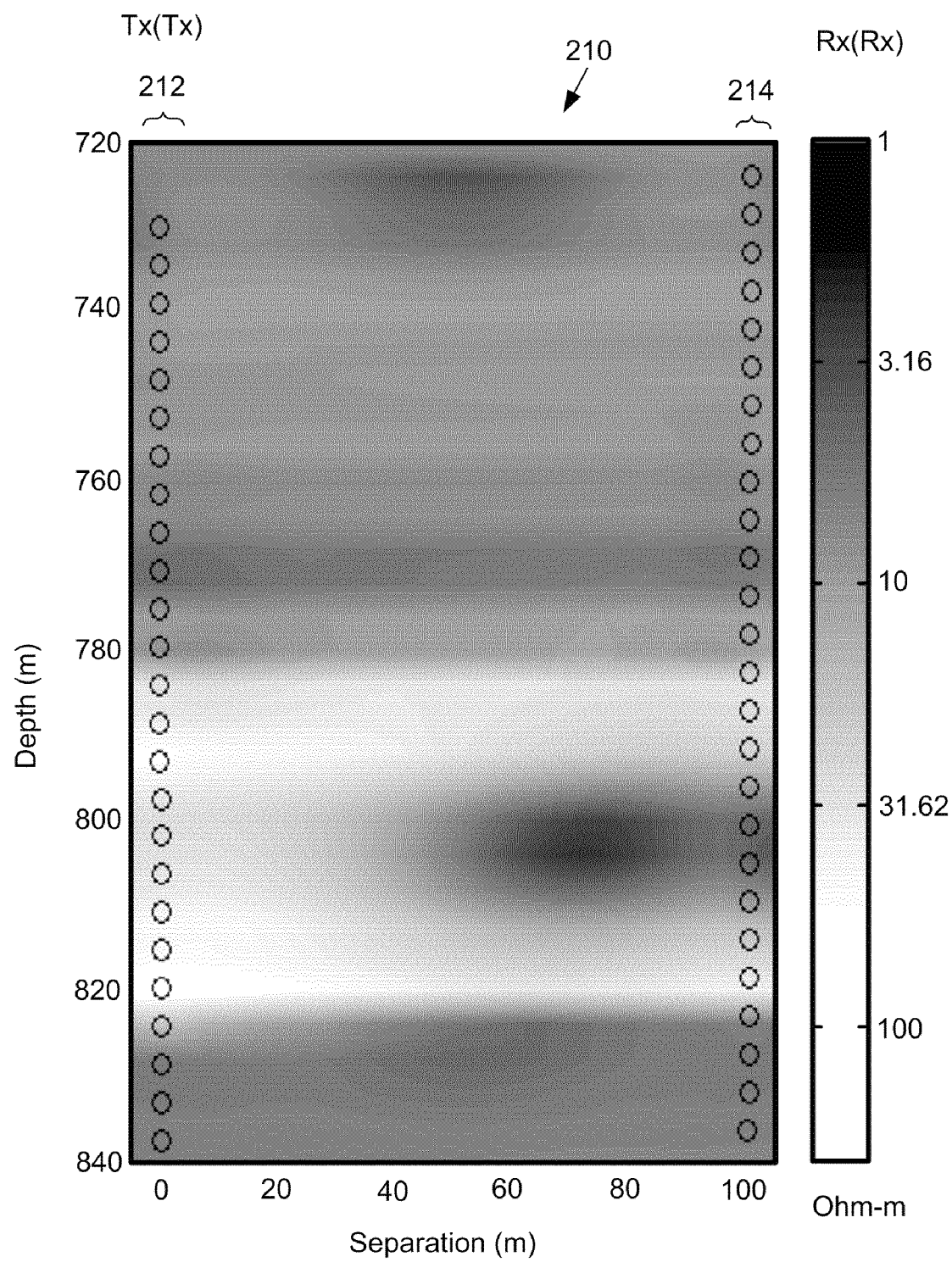

FIGS. 2A-B a plots of a synthetic example demonstrating a bias effect of unconstrained β inversions. In FIG. 2A, plot 210 shows a synthetic model used for computing x-well EM data between a well 212 having a number of transmitter locations and a well 214 having a number of receiver locations. In FIG. 2B, plot 220 shows the recovered model using an unconstrained β inversion on synthetic data. Note that the high conductivity zone immediately adjacent to the well bore 214 at about 800 m in the true model, plot 210 (FIG. 2A), but is not well recovered in the inverted image of plot 220 (FIG. 2B). A possible reason for this is that the data, and therefore the inversion, is much more sensitive to the β parameter than the formation resistivity immediately surrounding the wellbore. Thus some part of the resistivity variations are folded into the β values.

According to some embodiments, one method to alleviate this problem is to estimate β values independently from the casing parameters (δ, μ and t or a combination of these three parameters), and then use the estimated β to correct the field data. A non-β inversion is then executed on the casing corrected data in the same way that would be performed for a data set collected in open (i.e. non-steel cased) wells. However, it has been found that in some situation the β values can be estimated with sufficient certainty using such a hardware casing correction. If the uncertainty of the estimates is too large, then there remains a possibility that the inverted images will be biased due to the errors introduced by using less accurate β values for casing correction.

According to some embodiments, a method to alleviate the bias is to constrain the β values during the inversion. From experience, as well as from actual measurements on casing, it is known that the casing parameters (δ, μ and t) normally vary within a narrow range, especially for chromium casing (μ=1). Furthermore, although it may be difficult to accurately estimate the absolute value of the casing parameters, it is easier to estimate the variation from receiver to receiver position. Thus, according to some embodiments, a workflow as shown in FIG. 4 is used for constrained β inversions.

Figure 4:
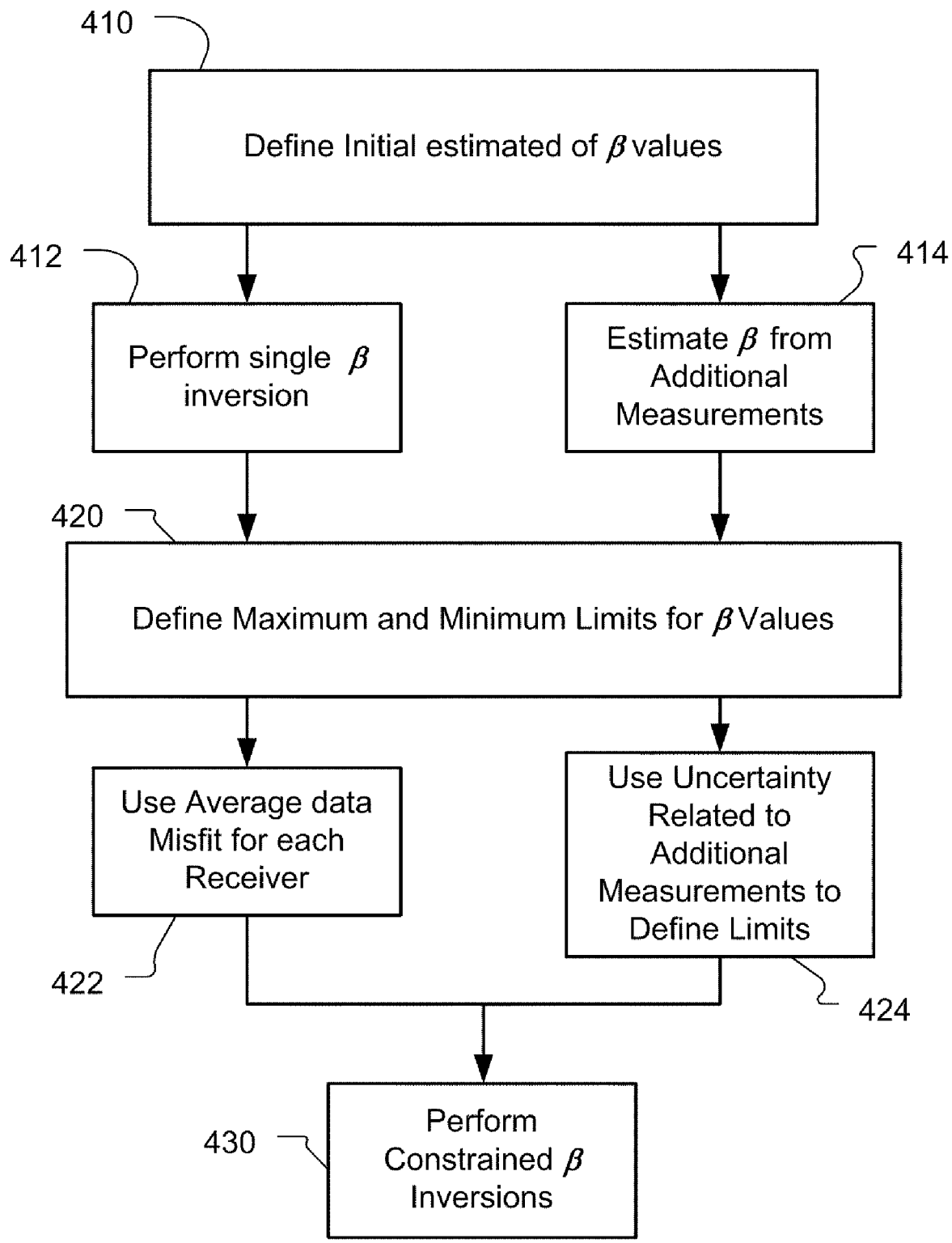
FIG. 4 is a flow chart illustrating steps in carrying out a constrained casing correction coefficient inversion process, according to some embodiments.

FIG. 4 is a flow chart illustrating steps in carrying out a constrained casing correction coefficient inversion process, according to some embodiments. In step 410, initial estimates of the β values are defined. This can be achieved using at least two different methods. One options is step 412, performing a single β inversion in which it is assumed that the casing has a constant value within the survey interval. After this initial inversion, the average β values are used as starting values for a constrained, multiple β inversion. Another options is step 414, estimating the β values from an additional set of measurements. This technique makes use of extra measurements that can provided for example by Schlumberger tools such as the Electro Magnetic Imager Tool (EMIT), the Cased Hole Formation Resistivity Tool (CHFR), the Ultra Sonic Imager Tool (USIT), and the DeepLook Electro Magnetic Tool (Deeplook EM). However, in general, the additional measurements can be taken from any downhole tool that measures some aspect of the casing.

In step 420, the maximum and minimum limits for the β values is defined. This once again can be achieved using different methods. In step 422, the average data misfit for each receiver after the single β inversion of step 412 can be used to define upper and lower limits of possible β variation. In step 424, on the other hand, if the initial β values are estimated from the additional measurements, as in step 414, then the uncertainty related with the estimation can be used to define the limits.

In step 430, the constrained β inversions are performed. In this multiple β inversion, although both β and m are still being estimated, the β values cannot change freely and instead are constrained to lie within the pre-defined limits determined in step 420 (and steps 422 or 424). For further details of carrying out the inversion process, see the '244 Patent, and the '993 and '320 Patent Applications.

Figure 3A:
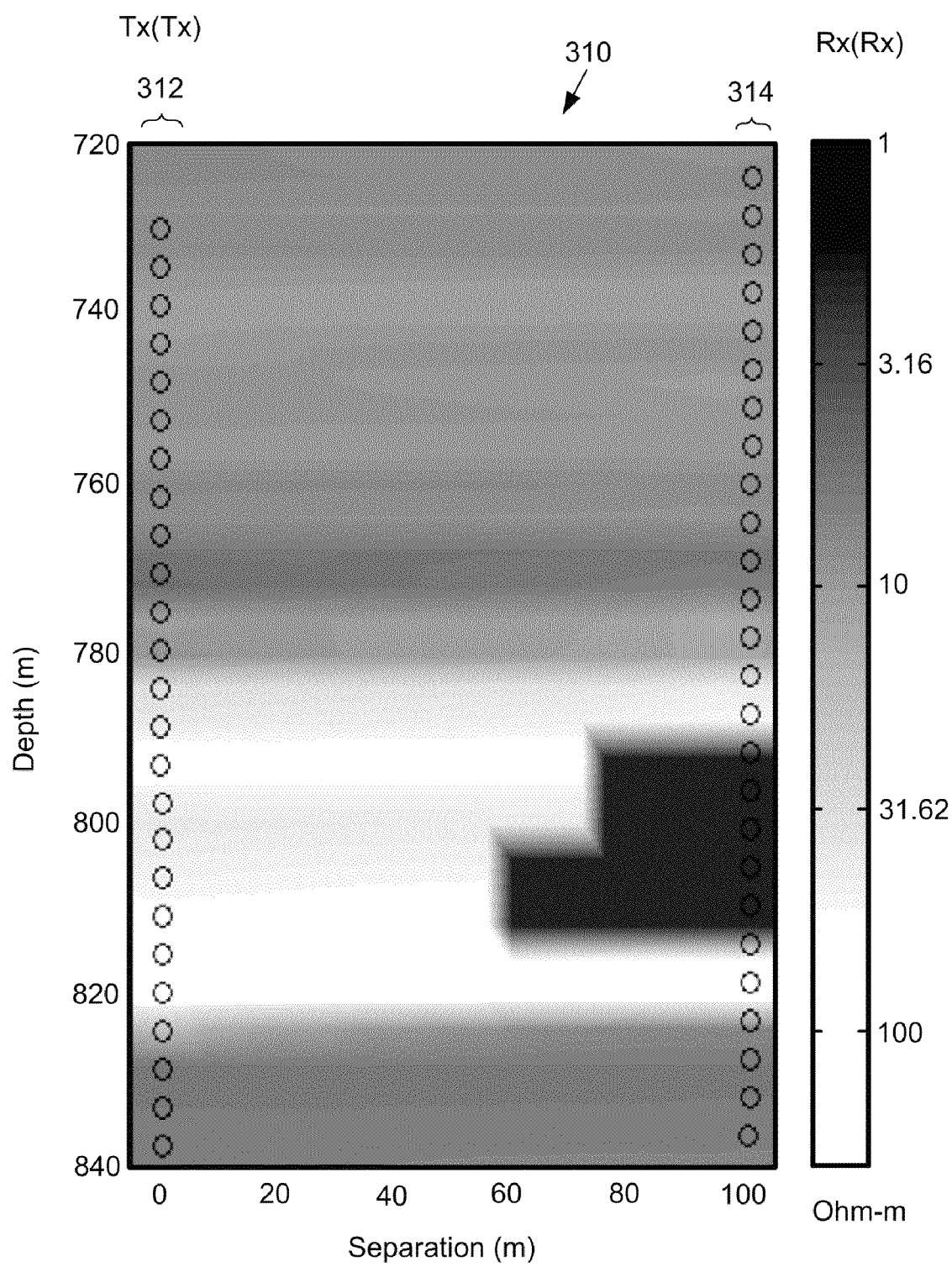
FIGS. 3A-B a plots illustrating a constrained β inversion using the same synthetic model as the one in FIG. 2A, according to some embodiments.
Figure 3B:
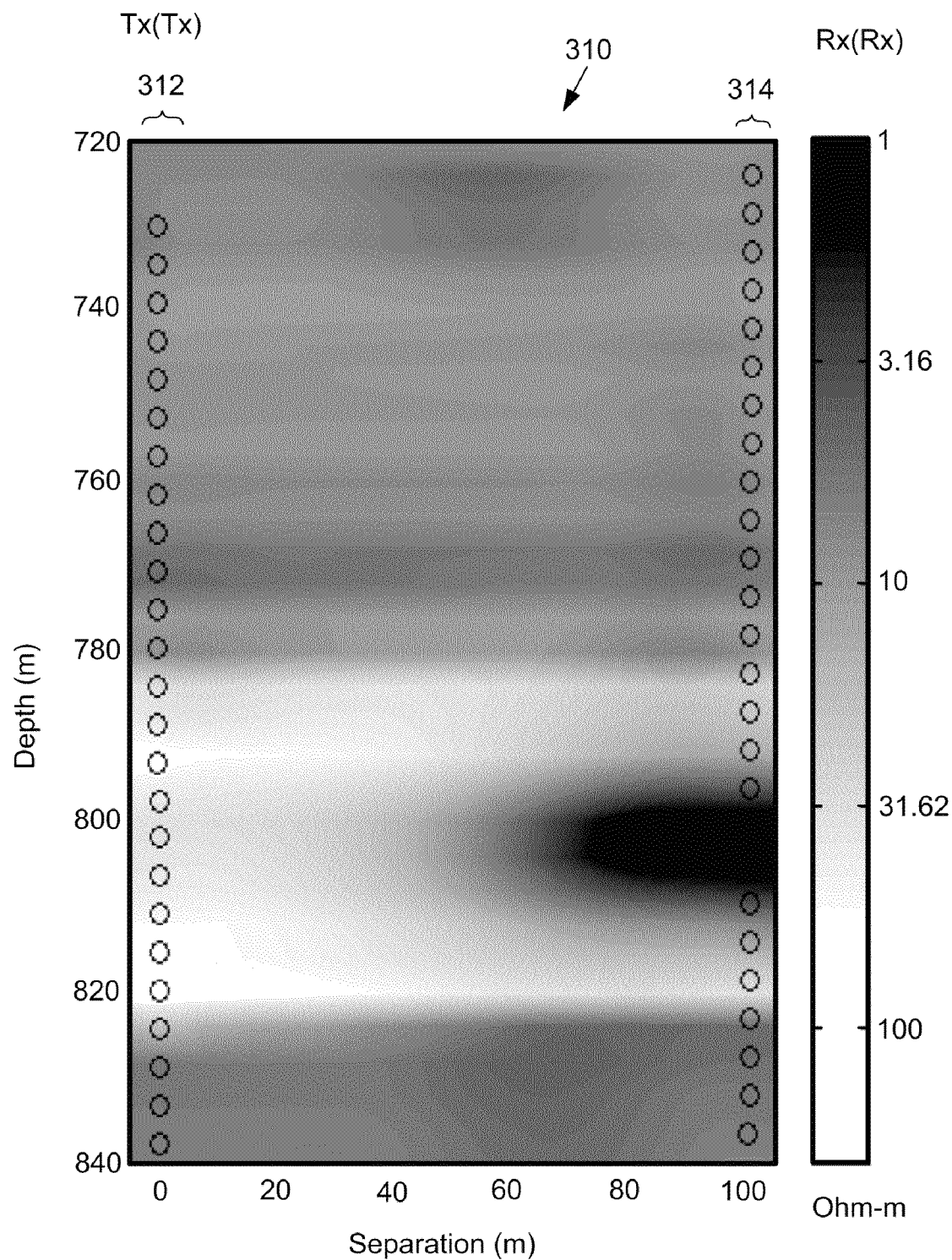

FIGS. 3A-B a plots illustrating a constrained β inversion using the same synthetic model as the one in FIG. 2A, according to some embodiments. In FIG. 3A, plot 310 shows the synthetic model used for computing x-well EM data between a well 312 having a number of transmitter locations and a well 314 having a number of receiver locations. In FIG. 3B, plot 320 shows the recovered model using a constrained β inversion on the synthetic data. Note that the high conductivity zone immediately adjacent to the well bore 214 at about 800 m in the true model, plot 310 (FIG. 3A), is well recovered in the inverted image of plot 320 (FIG. 3B).

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of analyzing electromagnetic survey data comprising:
   receiving electromagnetic survey data of a subterranean formation obtained using at least a first downhole transceiver deployed in a cased borehole and a second transceiver;
   computing predicted electromagnetic, data based on one or more models;
   defining one or more limits for one or more casing correction coefficients, the one or more casing correction coefficients being useful for accounting for effects of the borehole casing; and
   performing an inversion process based at least in part on comparing portions of the electromagnetic survey data and portions of the predicted electromagnetic data, the inversion process solving for at least the one or more casing correction coefficients within the defined one or more limits, and for one or more parameters of the model representing one or more attributes of the subterranean formation.

2. A method according to claim 1 wherein each of the one or more casing correction coefficients corresponds to casing effects at a depth position for a transceiver within the casing.

3. A method according to claim 1 wherein the casing is conductive.

4. A method according to claim 1 further comprising estimating values for the one or more casing correction coefficients.

5. A method according to claim 4 wherein the estimating values includes performing a separate inversion process assuming a single casing correction coefficient value for the casing at depth locations corresponding to the survey data.

6. A method according to claim 5 wherein the one or more limits are defined based at least in part on data misfit for each of a plurality of transceiver positions along the casing.

7. A method according to claim 4 wherein the estimating values is based at least in part on additional measurements.

8. A method according to claim 7 wherein the additional measurements are taken with a downhole tool that at least in part measures an aspect of the casing.

9. A method according to claim 8 wherein the additional measurements are of one or more types selected from the group consisting of: electromagnetic imaging, cased-hole formation resistivity, and ultrasonic imaging.

10. A method according to claim 7 wherein the one or more limits are defined based at least in part on uncertainty relating to the additional measurements.

11. A method according to claim 1 wherein, the defining one or more limits is based at least in part on estimating the one or more casing correction coefficients from one or more casing parameters, the casing parameters being of one or more types selected from the group consisting of: conductivity, magnetic permeability and thickness.

12. A method according to claim 1 wherein the one or more attributes include one or more types selected from the group consisting of: resistivity, conductivity, porosity and permeability.

13. A method according to claim 1 further comprising using the analyzed survey data to monitor water injected into the subterranean formation from the borehole.

14. A method according to claim 1 wherein the electromagnetic survey data primarily includes plurality of frequency ranges between about 0.1 Hz and 3 kHz.

15. A method according, to claim 1 wherein the first transceiver is an electromagnetic receiver.

16. A method according, to claim 15 wherein the receiver includes electrodes deployable downhole.

17. A method according to claim 15 wherein the receiver includes a magnetic field sensor deployable downhole.

18. A method according to claim 17 wherein the magnetic field sensor is of a type selected from the group consisting of induction coils sensors, fluxgate magnetormeters, and superconducting quantum interference devices.

19. A method according to claim 1 wherein the second transceiver is an electromagnetic transmitter adapted and configured to be deployable downhole in a second borehole.

20. A method according to claim 19 wherein the second transceiver is a transmitter adapted and configured to be deployable on land.

21. A method according to claim 19 wherein the second transceiver is a transmitter adapted and configured to be deployable in water in a marine environment.

22. A method according to claim 1 wherein the first transceiver is as transmitter and the second transceiver is a receiver adapted and configured to be deployable downhole in a second borehole.

23. A system for analyzing electromagnetic survey data analyzing comprising; a processing system configured and programmed to receive electromagnetic survey data of a subterranean formation obtained using at least a first downhole transceiver deployed in a cased borehole and a second transceiver, to compute predicted electromagnetic data based on one or more models, to define one or more limits for one or more casing correction coefficients, the one or more casing correction coefficients being useful for accounting for effects of the borehole casing, and to perform an inversion process based at least in part on comparing portions of the electromagnetic survey data and portions of the predicted electromagnetic data, the inversion process solving for at least the one or casing correction coefficients within the defined one or more limits, and for one or more parameters of the model representing one or more attributes of the subterranean formation.

24. A system according, to claim 23 wherein the processing system is further configured and programmed to estimate values for the one or more casing correction coefficients.

25. A system according to claim 24 wherein the values are estimated at least in part based on a separate inversion process assuming a single casing correction coefficient value for the casing at depth locations corresponding to the survey data.

26. A system according to claim 25 wherein the one or more limits are defined based at least in part on data misfit for each of a plurality of transceiver positions along the casing.

27. A system according to claim 24 wherein the values are estimated at least in part on additional measurements.

28. A method according to claim 27 wherein the one or more limits are defined based at least in part on uncertainty relating to the additional measurements.

29. A system according to claim 23 further comprising a downhole deployable electromagnetic receiver used as the first downhole transceiver.

30. A system according to claim 29 wherein the electromagnetic receiver includes electrodes deployable downhole.

31. A system according to claim 29 wherein the electromagnetic receiver includes a magnetic field sensor deployable downhole of a type selected from the group consisting of induction coils sensors, fluxgate magnetormeters, and superconducting quantum interference devices.

32. A system according to claim 23 further comprising:
an electromagnetic receiver adapted and configured to be deployable downhole; and
an electromagnetic transmitter adapted and configured to be deployable downhole in a second borehole, wherein the first transceiver is the electromagnetic receiver and the second transceiver is the electromagnetic transmitter.

33. A system according to claim 23 further comprising:
an electromagnetic receiver adapted and configured to be deployable downhole; and
an electromagnetic transmitter adapted and configured to be deployable on land, wherein the first transceiver is the electromagnetic receiver and the second transceiver is the electromagnetic transmitter.

34. A system according to claim 23 further comprising:
an electromagnetic receiver adapted and configured to be deployable downhole; and
an electromagnetic transmitter adapted and configured to be deployable in water in a marine environment, wherein first transceiver is the electromagnetic receiver and the second transceiver is the electromagnetic transmitter.

* * * * *